(No Model.)
F. BERLIN.
HARROW ATTACHMENT, &c.
No. 489,213. Patented Jan. 3, 1893.
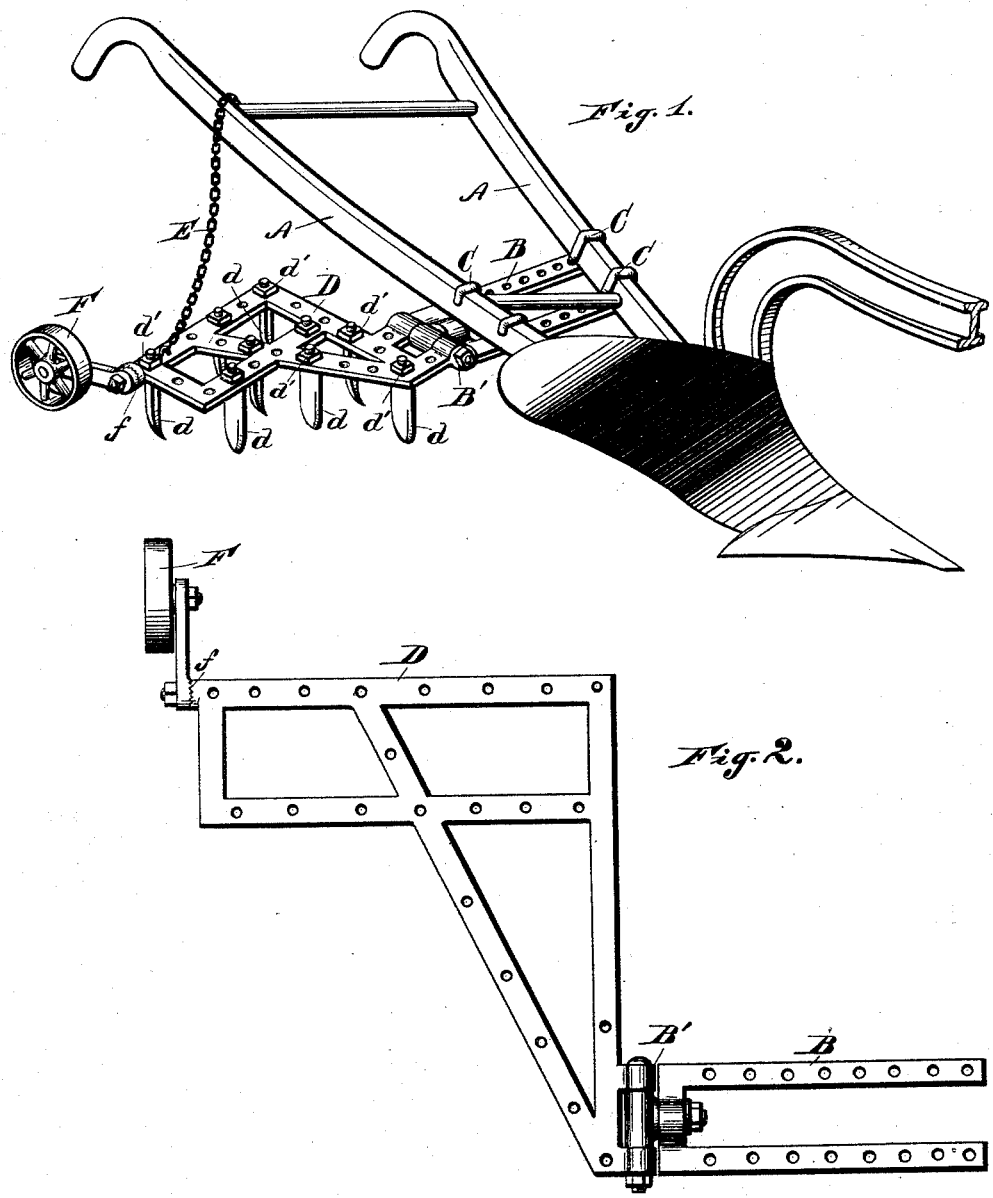
Attest.
M. M. Wiles
H. E. Deys
Inventor:
Frederick Berlin.
By John E. Wiles,
his Attorney.

UNITED STATES PATENT OFFICE.

FREDERICK BERLIN, OF DETROIT, MICHIGAN.

HARROW ATTACHMENT, &c.

SPECIFICATION forming part of Letters Patent No. 489,213, dated January 3, 1893.

Application filed January 20, 1890. Renewed November 4, 1892. Serial No. 450,947. (No model.)

*To all whom it may concern:*

Be it known that I, FREDERICK BERLIN, a citizen of the United States, residing at Detroit, county of Wayne, State of Michigan, have invented a certain new and useful Improvement in Harrow and Cultivator Attachments for Plows; and I declare the following to be a full, clear, and exact description of the invention, such as will enable others skilled in the art to which it pertains to make and use the same, reference being had to the accompanying drawings, which form a part of this specification.

My invention relates to certain new and useful improvements in "harrows and cultivators," but more particularly to that class of devices of this nature, adapted to be used as an adjunct to a plow.

The object of my invention is the construction of an improved harrow and cultivator, of such size and shape, that it may be readily attached to any plow, the arrangement being such that the harrow or cultivator shall be caused to travel with the plow, upon the newly turned furrow, immediately in the rear of the mold board, in such a manner as to thoroughly harrow and pulverize the freshly turned soil.

The various features of my invention will be more fully described and set forth in the following specification and claims, reference being made to the accompanying drawings, in which:

Figure 1—is a perspective view of a plow with my improved harrow and cultivator attached thereto. Fig. 2—is a plan view of my improved harrow and cultivator attachment.

A—represents the framework of any ordinary plow.

B—represents a perforated bar, plate or frame, to which the harrow and cultivator is connected by means of a multiple or universal joint B'—. As shown this joint consists of a swivel $B^2$ having a swivel connection at one end with the frame B, as shown at "$b$," to permit the rear harrow frame being raised and lowered, said swivel at the opposite end having a hinged connection with the harrow frame, as shown at "$b'$," thus forming a double or universal joint. Any other form of joint, which serves the same double or universal functions may be used instead. This bar, plate or frame B—, is adapted to be secured to the frame of the plow by means of suitable clips or bolts C—, adjustable to any position by means of the perforations therein.

D represents the harrow and cultivator, made in any suitable form, preferably having a triangular tooth or shovel bearing section, and a lateral rear extension, as shown, and provided with teeth $d$—said teeth being adjustably inserted into the frame of the harrow and cultivator by means of suitable bolt holes and nuts $d'$—.

Any style of shovel, semi shovel, square or angular harrow teeth may of course, be employed, according to the character of the soil to be plowed and harrowed. The front row or series of semi shovel shaped teeth as on that portion of the frame forming the hypotenuse of the triangular section are intended to serve as cutting blades for severing the roots in tough or heavy sod, and also for working dirt away from the plow, so as to cover or fill in the seams between the furrows. Accordingly the shovel-shaped teeth preferably extend laterally in an angular direction or line from the plow.

By reference to the drawings, it will be seen that the harrow and cultivator is arranged in such a manner as to follow in the rear of the mold board of the plow, so as to thoroughly harrow and pulverize the freshly turned furrow, immediately after it leaves the plow, and while it is in a moist condition. It will thus be seen, that, at the time of plowing, the ground may also be thoroughly harrowed and cultivated, thus dispensing with the use of extra machinery, teams and men; and at the same time more thoroughly accomplishing the work of harrowing and cultivating the ground, than could be done, if the ground were allowed to become dry and hard before the harrowing is done, as is usually the case.

By means of the multiple or universal joint B'— the harrow and cultivator is permitted to adjust itself to any unevenness of the ground. It will be obvious that thereby an oscillating or undulating motion is permitted to the harrow and cultivator, and that the outer end of said frame, provided with the carrying wheel, is vertically movable, and also that the rear end of the frame is likewise vertically movable so as to permit the frame being raised and lowered, in two different directions at right angles to each other, enabling the operator to raise the outer side or rear of the frame at will, either independently or conjointly. The undulatory movement is thus permitted to take place freely as the harrow and cultivator passes over any unevenness of the soil or furrows. This universal connection also permits the harrow and cultivator to be raised and lowered at will, in order to avoid stumps, stones and other obstructions.

E— represents a suitable chain by means of which the harrow and cultivator may be raised or lowered to avoid obstructions, or for the purpose of transportation. By this arrangement, the plowman is enabled to plow up close to a stump, stone or other obstruction, and at the same time, to thoroughly harrow the ground, he being enabled to raise the harrow at the proper moment, so as to avoid the obstruction, and to immediately drop it back into position for operation, as soon as the obstruction is passed.

F— represents a suitable carrying wheel, located upon the outer extremity of the harrow and cultivator, and adapted to sustain the weight of the harrow. This carrying wheel has an adjustable connection $f$— with the frame of the harrow, whereby the same may be set so as to cause the teeth of the harrow to dig more or less deeply into the ground, as may be desired.

It will be readily seen, that with slight modifications, my improved device may be adapted for use as an attachment to a sulky or wheeled plow, it being only necessary to modify the connections between the harrow and cultivator, and the frame of the plow, so as to cause the harrow to follow the freshly turned furrow, in the rear of the mold board, so as to pulverize the same while the ground is fresh and in a moist condition.

It will be seen, that by my improvement, one man is enabled to plow and also to thoroughly harrow and cultivate the soil at one and the same time, thus effecting a great saving of time and labor and also accomplishing the harrowing at the time when it is easiest and with no extra trouble to the operator, and but very little extra exertion for the team. I would have it understood, however, that I do not limit myself to the exact form of construction shown in the drawings, as the various features of my improvement may be modified without departing from my invention, and any form of device of this nature, which is adapted to be used as an adjunct to a plow, and having suitable means for attachment thereto by a swivel or universal joint, and to be used, in the manner and for the purposes herein set forth, I would regard as coming within the scope of my original invention.

The arrangement of shovel blades, so that they are calculated to work the ground away from the plow and fill up the seams between the furrows is a matter of great utility and importance.

Having thus described my invention, what I claim as new, and desire to secure by Letters Patent, is:

1. The combination with a harrow and cultivator frame of an attaching device, an intervening multiple joint, said frame constructed with a triangular section and having a laterally extended portion at the rear end of said section, and a carrying wheel having an adjustable connection with the laterally extended portion, substantially as set forth.

2. The combination with a plow of a harrow and cultivator, an attaching device, an intervening multiple joint located between the harrow and cultivator and the attaching device, a carrying wheel on the outer side of the harrow and cultivator, and means connecting said side with the plow for raising and lowering the same, substantially as set forth.

In testimony whereof I sign this specification in the presence of two witnesses.

FREDERICK BERLIN.

Witnesses:
 JOHN E. WILES,
 JOHN T. SIGGETT.